(12) United States Patent
Mizutani

(10) Patent No.: US 8,236,404 B2
(45) Date of Patent: Aug. 7, 2012

(54) HONEYCOMB STRUCTURE

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 411 days.

(21) Appl. No.: 12/481,263

(22) Filed: Jun. 9, 2009

(65) Prior Publication Data

US 2009/0246457 A1 Oct. 1, 2009

Related U.S. Application Data

(63) Continuation of application No. PCT/JP2007/073944, filed on Dec. 12, 2007.

(30) Foreign Application Priority Data

Feb. 2, 2007 (JP) ................................ 2007-024117

(51) Int. Cl.
*B32B 3/12* (2006.01)
*B01D 39/06* (2006.01)
*B01D 50/00* (2006.01)

(52) U.S. Cl. ............ 428/116; 428/117; 55/523; 422/181

(58) Field of Classification Search ........................ None
See application file for complete search history.

(56) References Cited

U.S. PATENT DOCUMENTS

| | | |
|---|---|---|
| 2002/0197193 A1 | 12/2002 | Harada et al. |
| 2003/0053940 A1 | 3/2003 | Harada et al. |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0102984 A1 | 5/2005 | Bardon et al. |
| 2007/0009707 A1 | 1/2007 | Ogura et al. |
| 2007/0051081 A1 | 3/2007 | Mizutani |
| 2007/0227109 A1 | 10/2007 | Hong et al. |
| 2007/0240396 A1 | 10/2007 | Mizutani |
| 2008/0014405 A1 | 1/2008 | Sakamoto |
| 2008/0034744 A1* | 2/2008 | Bardon et al. .................. 60/324 |

(Continued)

FOREIGN PATENT DOCUMENTS

EP 0 361 883 A1 4/1990

(Continued)

OTHER PUBLICATIONS

New U.S. Patent Application filed Jun. 9, 2009 in the name of Takashi Mizutani.

(Continued)

*Primary Examiner* — Gordon R Baldwin
(74) *Attorney, Agent, or Firm* — Oliff & Berridge, PLC

(57) ABSTRACT

A honeycomb structure comprising a plurality of columnar honeycomb segments in which two kinds of plural through-holes different in end face area are formed side by side by being surrounded by partition walls, each honeycomb segment having, at one end face, an inlet side of high opening ratio, wherein through-holes of smaller end face area are plugged and, at other end face, an outlet side of low opening ratio, and wherein through-holes of larger end face area are plugged, the plurality of honeycomb segments being bonded to each other via a bonding material in the longitudinal direction of each honeycomb segment. The Young's modulus of the bonding material when sintered is smaller than that of each honeycomb segment when sintered, and the bonded width of the bonding material is larger at the outlet side of honeycomb structure than at the inlet side is presented.

2 Claims, 3 Drawing Sheets

U.S. PATENT DOCUMENTS

2008/0086993 A1   4/2008   Komori et al.

FOREIGN PATENT DOCUMENTS

| FR | 2 789 327 A1 | 8/2000 |
| JP | A 2001-190916 | 7/2001 |
| JP | A 2004-162537 | 6/2004 |
| JP | A 2004-188278 | 7/2004 |
| JP | A 2005-512782 | 5/2005 |
| JP | A 2007-14886 | 1/2007 |
| WO | WO 01/93984 A1 | 12/2001 |
| WO | WO 2004/024293 A1 | 3/2004 |
| WO | WO 2005/014142 A1 | 2/2005 |
| WO | WO 2005/089902 A1 | 9/2005 |
| WO | WO 2006/027487 A1 | 3/2006 |
| WO | WO 2006/126507 A1 | 11/2006 |

OTHER PUBLICATIONS

Jul. 25, 2011 Supplemental European Search Report issued in Application No. 07850495.8.

* cited by examiner

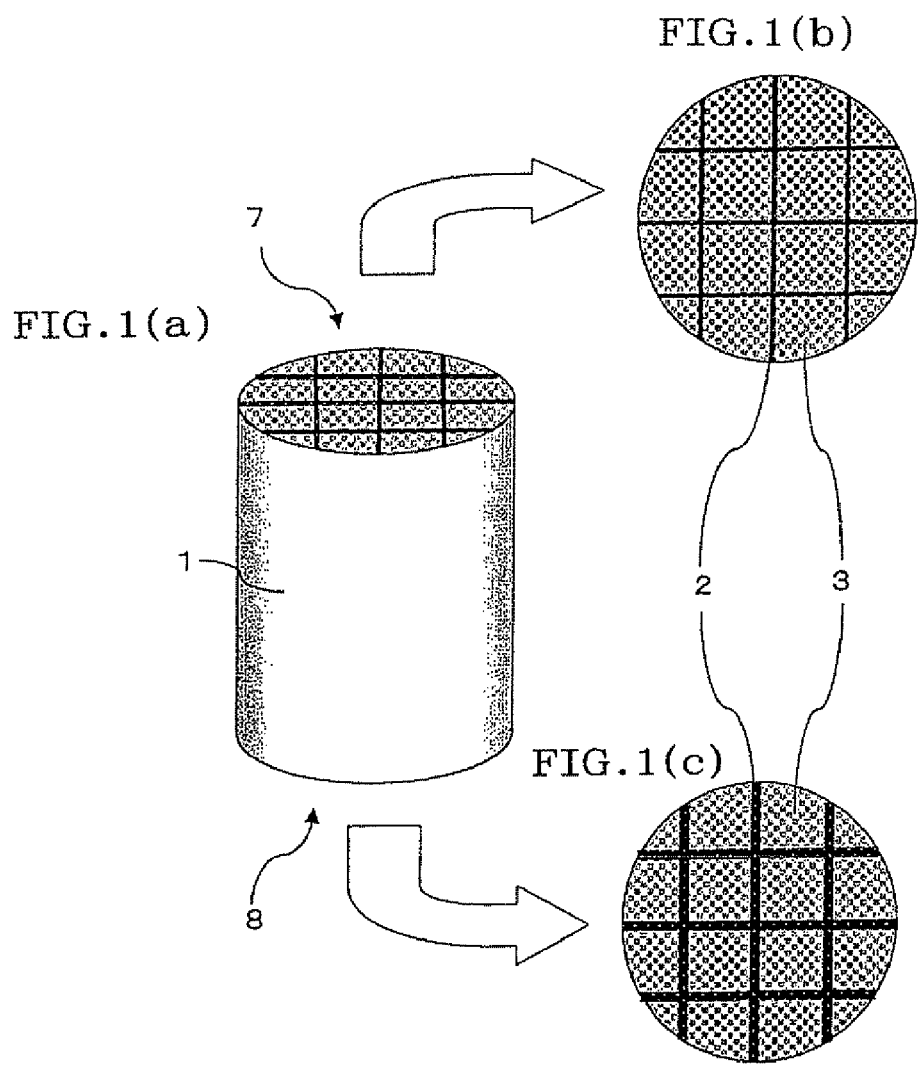
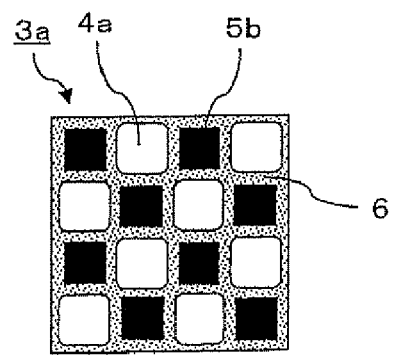

HONEYCOMB STRUCTURE

This is a Continuation of International Application No. PCT/P2007/073944 filed Dec. 12, 2007, which claims the benefit of Japanese Application No. 2007-024117 filed Feb. 2, 2007. The disclosures of the prior applications are hereby incorporated by reference herein in their entirety.

TECHNICAL FIELD

The present invention relates to a honeycomb structure. More particularly, the present invention relates to a honeycomb structure which is small in the amount of cracks formed when regenerated.

BACKGROUND ART

Catalyst component-loaded honeycomb structures have been used in exhaust gas purification devices for heat engine (e.g. internal combustion engine) or burner (e.g. boiler), reformers of liquid fuel or gaseous fuel, etc. Also, it is known to use a honeycomb structure as a filter for capture and removal of the particles contained in a particle-containing fluid such as exhaust gas discharged from diesel engine.

In such honeycomb structures used for the above purpose, non-uniform temperature distribution tends to appear inside owing to the sudden temperature change of exhaust gas or the local heat generation, which has caused problems such as cracking. In order to alleviate these problems, it was proposed to constitute a honeycomb structure in an integral structure of a plurality of honeycomb segments, by bonding individual honeycomb segments with an elastic bonding material, to relax the thermal stress applied to the structure.

Further, in mounting a diesel particulate filter (a DPF) of honeycomb structure beneath the floor of vehicle, a DPF of large size is used in order to deposit a larger amount of particles for improvement of fuel consumption, or there is used, in some cases, a DPF in which the opening ratio of inlet cells is higher than the opening ratio of outlet cells, for lower pressure loss.

However, there were cases that the deposition of a larger amount of particles caused cracks at the downstream end face of DPF owing to the thermal stress appearing when the deposited particles were burnt for regeneration.

In Patent Document 1 it is disclosed a technique of using a higher plugging ratio at the center of end face of honeycomb structure than at the periphery of end face of honeycomb structure to suppress the temperature elevation during the regeneration of honeycomb structure and enhance the limit of crack generation.

In Patent Document 2 it is disclosed a technique of deepening the plugged portion at the center of end face of honeycomb structure to suppress the temperature elevation during the regeneration of honeycomb structure.

Patent Document 1: WO 2005/014142
Patent Document 2: JP-A-2004-162537

DISCLOSURE OF THE INVENTION

In a honeycomb structure in which the inlet cells have a larger opening diameter than the outlet cells, as compared with the case of ordinary honeycomb structure, particles are deposited in a larger amount at the outlet side (since the pressure loss in gas passage through each cell is higher at the outlet side, the inertia force at the inlet side is larger and the gas velocity at around the outlet is higher). Further, the heat generation by the particle combustion conducted for regeneration of honeycomb structure makes higher the temperature of outlet side and, when the opening diameter is larger at the inlet side, the amount of particles is larger at the outlet side, making even higher the temperature of outlet side. There is a problem that this higher temperature causes thermal expansion and, in some cases, generates cracks around the end face of each honeycomb segment constituting the honeycomb structure. Therefore, in a honeycomb structure in which the inlet cells have a higher opening ratio than the outlet cells, there has been required a technique for effectively suppressing the generation of cracks.

The present inventors made a study in order to achieve the above task. As a result, it was found that the above task could be achieved by making larger the bonded width between the honeycomb segments constituting a honeycomb structure, at their outlet sides than at their inlet sides and absorbing the thermal stress generated in each segment, by a bonding material having a low Young's modulus, to enhance the limit of crack generation during the regeneration of honeycomb structure. The finding has led to the completion of the present invention.

The present invention provides a honeycomb structure shown below.

[1] A honeycomb structure comprising a plurality of columnar honeycomb segments in which two kinds of plural through-holes different in end face area are formed side by side by being surrounded by partition walls, each honeycomb segment having, at one end face, an inlet side of high opening ratio wherein through-holes of smaller end face area are plugged and, at other end face, an outlet side of low opening ratio wherein through-holes of larger end face area are plugged, the plurality of honeycomb segments being bonded to each other via a bonding material in the longitudinal direction of each honeycomb segment,
in which honeycomb structure
the Young's modulus of the bonding material when sintered is smaller than the Young's modulus of each honeycomb segment when sintered, and
the bonded width of the bonding material is larger at the outlet side of honeycomb structure than at the inlet side of honeycomb structure.

[2] A honeycomb structure according to [1], wherein, in the following formula (1), $0<\alpha<1.7$ is satisfied.

$$W_{Out}=W_{In}+\alpha \cdot OFA_{Out}/OFA_{In} \quad (1)$$

[wherein $W_{In}$ is a bonded width at inlet side, $W_{Out}$ is a bonded width at outlet side, $OFA_{In}$ is an opening ratio at inlet side, and $OFA_{Out}$ is an opening ratio at outlet side.]

According to the present invention, the bonded width at the outlet side is larger; therefore, the thermal expansion of each segment, in the radial direction is absorbed and the generation of cracks is suppressed.

BRIEF DESCRIPTION OF THE DRAWINGS

FIG. 1 is a schematic drawing showing an embodiment of the honeycomb structure of the present invention.

FIG. 2 is a schematic plan view (of inlet side) showing an embodiment of each honeycomb segment constituting the honeycomb structure of the present invention.

EXPLANATION OF SYMBOLS 1 is a honeycomb structure; 2 is a bonding material; 3, 3a and 3b are each a honeycomb segment; 4, 4a, 4b, 5, 5a and 5b are each a through-hole (a cell); 6 is a partition wall; 7 is an inlet side; and 8 is an outlet side.

BEST MODE FOR CARRYING OUT THE INVENTION

The best mode for carrying out the present invention is described below. However, the present invention is not restricted to the following embodiments, and it should be construed that the following embodiments can be subjected to appropriate changes, modifications, etc. based on the ordinary knowledge possessed by those skilled in the art as long as there is no deviation from the gist of the present invention and that even such changed or modified embodiments fall in the scope of the present invention.

The present invention is briefly described with reference to FIGS. 1 to 4.

In the present invention, the honeycomb structure refers to a structure having a large number of through-holes (cells) extending in the axial direction, surrounded by partition walls. FIG. 1 is a schematic drawing showing an embodiment of the honeycomb structure of the present invention. As shown in FIG. 1, the honeycomb structure 1 is constituted by bonding a plurality of honeycomb segments 3 with a bonding material 2.

Figure 3:
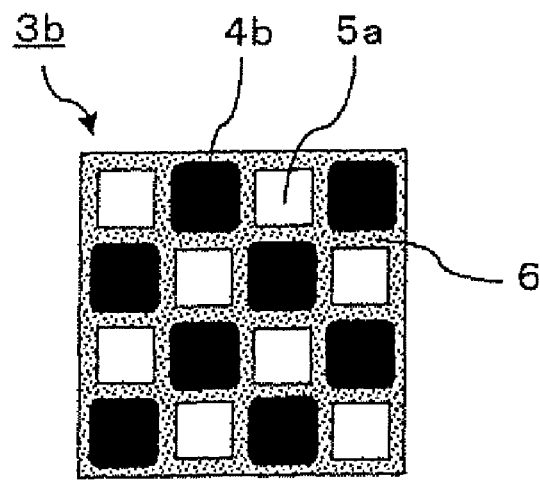
FIG. 3 is a schematic plan view (of outlet side) showing an embodiment of each honeycomb segment constituting the honeycomb structure of the present invention.

The detail of each honeycomb segment is shown in FIGS. 2 and 3. FIG. 2 is a plan view when an embodiment of each honeycomb segment constituting the honeycomb structure of the present invention has been seen from the inlet side of fluid passage, and FIG. 3 is a plan view when an embodiment of each honeycomb segment constituting the honeycomb structure of the present invention has been seen from the outlet side of fluid passage. As shown in FIGS. 2 and 3, each honeycomb segment (3a, 3b) is constituted by arranging two kinds of cells (4a, 4b, 5a, 5b) having different sectional areas in the segment section vertical to fluid passage, alternately in a checkered pattern via partition walls 6. As shown in FIG. 2, each cell 5b having a smaller sectional area is plugged at the inlet side of fluid passage; meanwhile, as shown in FIG. 3, each cell 4b having a larger sectional area is plugged at the outlet side of fluid passage. Therefore, the opening ratio at end face is higher at the inlet side shown in FIG. 2 than at the outlet side shown in FIG. 3.

Figure 4:
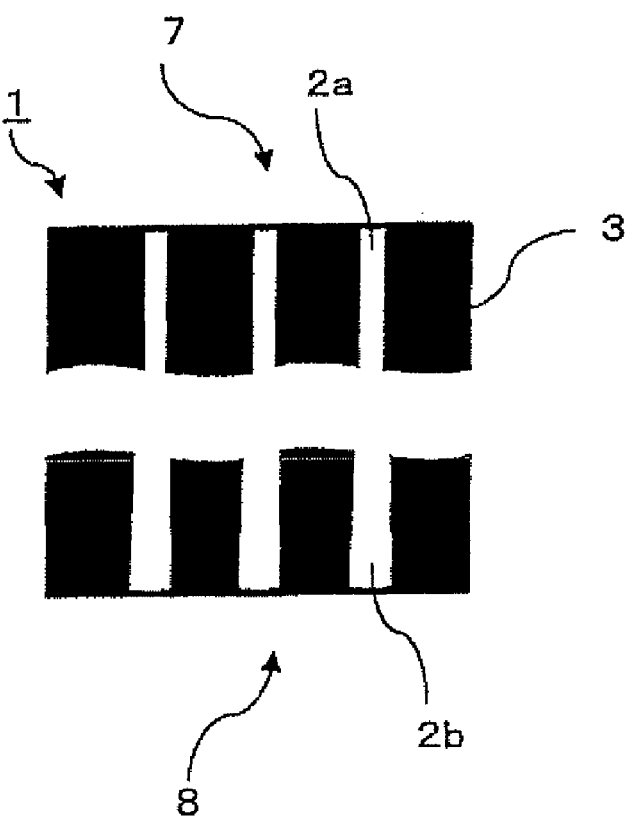
FIG. 4 is a schematic vertical sectional view showing an embodiment of the honeycomb structure of the present invention.

FIG. 4 is a schematic sectional view of an embodiment of the honeycomb structure of the present invention when the embodiment has been cut along the fluid passage direction and the middle portion thereof has been omitted. In FIG. 4, the honeycomb structure 1 is constituted by bonding a plurality of honeycomb segments 3 with a binding material 2a or 2b. As shown in FIGS. 1 and 4, in the present invention, the bonded width of the bonding material (2, 2a or 2b) is small at the inlet side 7 and large at the outlet side 8.

Figure 5:
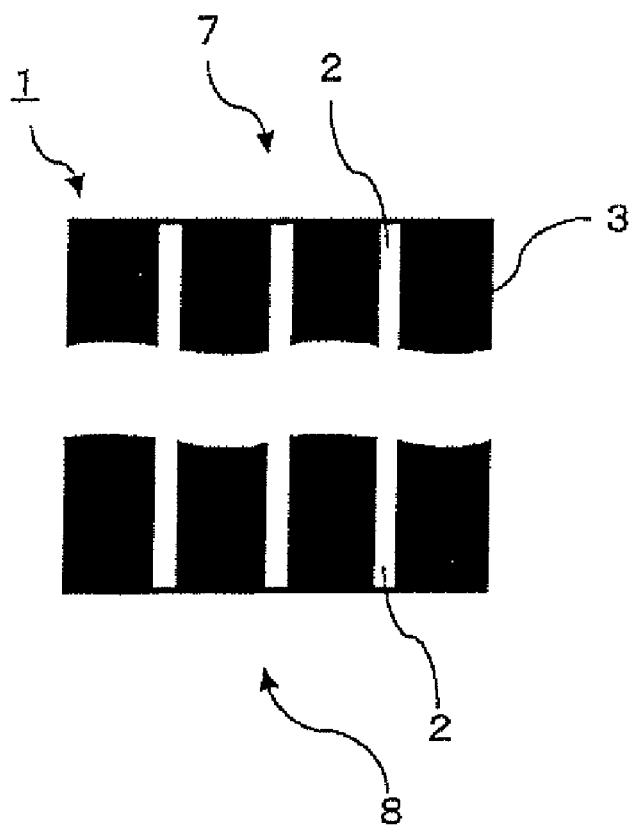
FIG. 5 is a schematic vertical sectional view of a honeycomb structure according to the prior art.

Meanwhile, in the honeycomb structure of the prior art, the bonded width is the same at the inlet side and the outlet side of fluid passage. FIG. 5 is a schematic sectional view of the honeycomb structure of the prior art when, in the same manner as in FIG. 4, the structure has been cut along the fluid passage direction and the middle portion thereof has been omitted. In FIG. 5, the bonded width of the bonding material 2 of the honeycomb structure 1 is the same at the inlet side 7 and the outlet side 8. Here, the bonded width refers to an average of the widths of the middle parts of the four bonded material portions contacting with the four sides of each segment at each end face of segment.

In the honeycomb structure of the present invention, it is preferred that, in the following formula (1), $0<\alpha<1.7$ is satisfied.

$$W_{Out}=W_{In}+\alpha \cdot OFA_{Out}/OFA_{In} \tag{1}$$

[wherein $W_{In}$ is a bonded width at inlet side, $W_{Out}$ is a bonded width at outlet side, $OFA_{In}$ is an opening ratio at inlet side, and $OFA_{Out}$ is an opening ratio at outlet side.]

When $\alpha$ is 0 or less, a larger amount of soot deposit downstream of the inlet cells; therefore, the temperature of downstream side becomes very high during regeneration and risk of crack generation is high. When $\alpha$ is 1.7 or more, the cell opening ratio is too small and a rise in pressure loss appears.

In the present invention, in view of strength and heat resistance, the main component of the honeycomb structure is preferably at least one kind of material selected from the group consisting of cordierite, mullite, alumina, spinel, silicon carbide, silicon carbide-cordierite composite material, silicon-silicon carbide composite material, silicon nitride, lithium aluminum silicate, aluminum titanate, Fe—Cr—Al metal and combinations thereof. Silicon carbide or a silicon-silicon carbide composite material is particularly suitable as the main component of the present honeycomb structure. Here, "the main component" refers to a component constituting 50 mass % or more, preferably 70 mass % or more, more preferably 80 mass % or more of the honeycomb structure. Further, in the present invention, when the honeycomb structure is made of metal silicon (Si) and silicon carbide (SiC) and when the Si content of the honeycomb structure, specified by Si/(Si+SiC) is too low, the effect of Si addition is not obtained and, when the Si content is higher than 50 mass %, the effect of heat resistance and high heat conductivity (which are characteristics of SiC) is not obtained. The Si content is preferably 5 to 50 mass %, more preferably 10 to 40 mass %.

The cell density of each honeycomb segment is preferably 6 to 2,000 cells/in.$^2$ (0.9 to 310 cells/cm$^2$). When the cell density is less than 6 cells/in.$^2$ (0.9 cells/cm$^2$), the strength and effective GSA (geometrical surface area) to be possessed by the honeycomb segment is insufficient. When the cell density is more than 2,000 cells/in.$^2$ (310 cells/cm$^2$), the pressure loss in gas flow is large.

The thickness of each partition wall of the honeycomb segment is preferably 50 to 2,000 μm. When the thickness of the partition wall is less than 50 μm, the strength of the honeycomb segment is insufficient and, when the thickness of the partition wall is more than 2,000 μm, the effective GSA of the honeycomb segment is low and the pressure loss in gas flow is large when gas flows. The sectional shape (cell shape) of each through-holes of the honeycomb segment is preferably any of triangle, tetragon and hexagon from the standpoint of the production.

In the present invention, there is no particular restriction as to the heat conductivity of the honeycomb structure. However, too high heat conductivity is not preferred because the heat radiation is too large, no sufficient temperature elevation is obtained during the regeneration, and the efficiency of regeneration is low. Too low heat conductivity gives rise to local temperature elevation during the regeneration, which tends to generate more cracks owing to a large thermal stress. The heat conductivity of the honeycomb structure is preferably 10 to 60 W/mK, more preferably 20 to 55 W/mK, most preferably 25 to 50 W/mK, at 40° C.

In the honeycomb structure of the present invention, there is no particular restriction as to the size of the honeycomb segment. However, too large honeycomb segment tends to cause breakage due to the thermal stress, and too small honeycomb segment makes complex the production or integration by bonding, of segments; therefore, such a honeycomb segment is not preferred. A preferred segment size is 900 mm$^2$ to 10,000 mm$^2$, more preferably 950 mm$^2$ to 5,000 mm$^2$, most preferably 1,000 mm$^2$ to 3,500 mm$^2$ in terms of sectional area. Preferably, 70 volume % or more of the honeycomb structure is constituted by honeycomb segments of such a size. There is no particular restriction as to the shape of the honeycomb segment; however, the sectional shape is preferably tetragonal.

The honeycomb structure of the present invention is formed by integrating a plurality of honeycomb segments. The integration is conducted using a bonding material. The bonding material when sintered has a Young's modulus lower than that of each honeycomb segment when sintered. A preferred bonding material can be selected from the above-mentioned materials preferably used as the main component of the honeycomb structure. Explaining in detail, it is preferred to use, as the bonding material for bonding honeycomb segments, a heat-resistant ceramic fiber, a ceramic powder, a cement, etc. singly or in admixture. Further use as necessary, of an organic binder, an inorganic binder, etc. is preferred because it improves the bonding ability of bonding material. Too large difference in thermal expansion coefficient between the bonding material and the honeycomb segment is not preferred because a thermal stress is concentrated at each bonded material portion during heating or cooling. The difference in thermal expansion coefficient from 20° C. to 800° C. between the bonding material and the honeycomb segment is preferably $1\times10^{-6}$/° C.

The material for plugging the open end of each through-holes is preferably at least one kind of material selected from the above-mentioned ceramics and metals preferably used in the honeycomb structure and is more preferably the same material as the main component of the honeycomb structure.

When the honeycomb structure of the present invention is intended to be used, as a catalyst carrier, for exhaust gas purification in heat engine (e.g. internal combustion engine) or burner (e.g. boiler) or for reforming of liquid fuel or gaseous fuel, it is preferred that the honeycomb structure of the present invention has a catalyst (e.g. a metal having a catalytic activity) loaded thereon. As representative metals having a catalytic activity, Pt, Pd and Rh can be mentioned. Preferably, at least one kind of these metals is loaded on the honeycomb structure.

Next, the method for producing the honeycomb structure of the present invention is described.

As the raw material powder for the honeycomb structure, the above-mentioned preferred material (e.g. a silicon carbide powder) is used. Thereto is added a binder, for example, methyl cellulose and hydroxypropoxyl methyl cellulose. Further, a surfactant and water are added to prepare a plastic clay. The clay is extruded using a die capable of forming a honeycomb segment of the present invention, that is, a honeycomb segment constituted by two kinds of cells different in end face sectional area, to obtain a honeycomb segment having an intended shape.

The above honeycomb segment is dried by using, for example, a microwave or hot air. In this case, by placing a pressing plate at the outlet side and applying a pressure, the sectional size of segment at the outlet side can be made smaller than the sectional size of segment at the inlet side.

Incidentally, as a method other than the above, for making smaller the sectional size of segment at the outlet side than the sectional size of segment at the inlet side, there is a method (using a pressing plate) of making smaller the segment size from the inlet toward the outlet in a tapered shape, or a method of changing the drying condition between the inlet side and the outlet side.

The dried honeycomb segment is plugged, at one of either open end of each through-holes, with the same material as used in production of the honeycomb structure, in such a way that each end face of the honeycomb segment looks like a checkered pattern; is further dried; then, is subjected to debinder with heating in, for example, a $N_2$ atmosphere; thereafter, is fired in an inert atmosphere (e.g. Ar) to obtain a honeycomb segment of the present invention. The honeycomb segment can also be obtained by cutting the outer circumference of a conventional honeycomb segment. A plurality of the thus-obtained honeycomb segments are bonded with, for example, a ceramic cement having a lower Young's modulus than the honeycomb segments and then dried, for example, at 200° C. for hardening, to obtain a honeycomb structure of the present invention.

The loading of a catalyst on the thus-produced honeycomb structure can be conducted by a method ordinarily used by those skilled in the art. For example, a catalyst slurry is wash-coated, followed by drying and firing, whereby a catalyst can be loaded.

EXAMPLES

The present invention is described specifically below by way of Examples. However, the present invention is in no way restricted to these Examples.

Example 1-1

A mixed powder consisting of 75 mass % of a SiC powder and 25 mass % of a metal Si powder was used as a raw material. Thereto were added methyl cellulose, hydroxypropoxyl methyl cellulose, a surfactant and water to produce a plastic clay. The clay was extruded. The extrudate was dried using a microwave and hot air to obtain a honeycomb segment having a porosity of 43%, an average pore diameter of about 10 μm, a partition wall thickness of 10 mil, and a cell density of 300 cpsi. In this case, a pressing plate was placed at the outlet side and a pressure was applied, whereby the sectional size of the segment was made smaller. The honeycomb segment was plugged at each end face with the same material as used in production of honeycomb structure in such a way that each through-holes of the honeycomb segment was plugged at one of either open end and each end face of the honeycomb segment had a checkered pattern; and the plugged honeycomb segment was dried, then subjected to debinder at about 400° C. in an $N_2$ atmosphere, thereafter fired at about 1,550° C. in an Ar inert atmosphere, to obtain a honeycomb segment of Si-bonded SiC. A plurality of such honeycomb segments were bonded with a mixture of an aluminosilicate, a silicon carbide powder, a silica gel, an organic binder and an inorganic binder; and the bonded honeycomb segments were dried at 200° C. for hardening and then subjected to cutting, to obtain a columnar honeycomb structure for DPF, having a diameter of 5.66 in. (143.8 mm) and a length of 6 in. (152.4 mm). The inlet side bonded width was 1.00 mm, the outlet side bonded width was 1.06 mm, the $OFA_{Out}/OFA_{In}$ was 0.59 and the α was 0.1. The Young's modulus of each segment was 27 GPa and the Young's modulus of the bonding material was 50 MPa. The honeycomb structure was subjected to the following evaluation tests. The results are shown in Table 1.

[Particle Amount at Breakage]

Samples different in outlet side opening ratio and a were prepared. They were subjected to a regeneration test using an engine. The amount of deposited particles was increased by each 1 g/L from 10 g/L up to 16 g/L, and the particle amount at crack generation was examined.

The engine displacement was 2.0 L, the engine speed was 2,000 rpm, and the torque was 50 Nm. The engine was controlled so that the gas temperature of sample inlet became 650° C. The test was conducted in a mode of monitoring the pressure loss and, when the pressure loss began to drop, switching to an idling state.

In the regeneration, the switch to an idling state causes an increase in oxygen concentration and the flow rate decreases; as a result, sudden combustion takes place in the DPF and this combustion may generate cracks. This crack generation was observed after the test, using a microscope.

[Pressure Loss]

A DPF was installed in a bell mouth-shaped wind tunnel of suction type. In a chamber of 25° C., the flow rate was controlled at 10 Nm$^3$/min and the pressure loss before and after the DPF was measured.

Examples 1-2 to 1-4

Columnar honeycomb structures were produced in the same manner as in Example 1-1 except that the $W_{Out}$ was set at 1.12, 1.30 and 1.53, respectively, and the α was set at 0.2, 0.5 and 0.9, respectively. They were subjected to the above-mentioned evaluation tests. The results are shown in Table 1.

Comparative Example 1

A columnar honeycomb structure was produced in the same manner as in Example 1-1 except that the $W_{Out}$ was set at 1.00 and the α was set at 0. It was subjected to the above-mentioned evaluation tests. The results are shown in Table 1.

Reference Example 1

There was produced a columnar honeycomb structure having the same opening ratio and the same bonded width between the inlet side and the outlet side. It was subjected to the above-mentioned evaluation tests. The results are shown in Table 1.

Examples 2-1 and 2-2, Comparative Example 2-1, and Comparative Example 2

Columnar honeycomb structures of Examples 2-1 and 2-2, Comparative Example 2-1 and Comparative Example 2 were produced by setting the partition wall at 15 mil, the $OFA_{Out}/OFA_{In}$ at 0.31, the $W_{Out}$ at 1.15, 1.31, 1.53, 1.00, respectively, and the α at 0.5, 1.0, 1.7 and 0.0, respectively. They were subjected to the above-mentioned evaluation tests. The results are shown in Table 1.

Reference Example 2

There was produced a columnar honeycomb structure having the same opening ratio and the same bonded width between the inlet side and the outlet side. It was subjected to the above-mentioned evaluation tests. The results are shown in Table 1.

Examples 3-1-1 to 3-1-3

Columnar honeycomb structures of Examples 3-1-1 to 3-1-3 were produced by setting the partition wall at 15 mil, the cell density at 160 cpsi, the $OFA_{Out}/OFA_{In}$ at 0.51, the $W_{Out}$ at 1.10, 1.30 and 1.51, respectively, and the α at 0.2, 0.6 and 1.0, respectively. They were subjected to the above-mentioned evaluation tests. The results are shown in Table 1. Incidentally, Example 3-1-1 corresponds to Example 3-2-1 in the Examples described later.

Examples 3-2-2 and 3-2-3

Columnar honeycomb structures were produced in the same manner as in Example 3-1-1 (corresponding to 3-2-1) except that the $W_{Out}$ was set at 1.09 and 1.08, respectively, and the $OFA_{Out}/OFA_{In}$ was set at 0.46 and 0.42, respectively. They were subjected to the above-mentioned evaluation tests. The results are shown in Table 1.

Reference Example 3

There was produced a columnar honeycomb structure having the same opening ratio and the same bonded width between the inlet side and the outlet side. It was subjected to the above-mentioned evaluation tests. The results are shown in Table 1.

TABLE 1

| Examples | Partition wall thickness (mil) | Cell density (cpsi) | $OFA_{Out}/OFA_{In}$ | α | $W_{In}$ (mm) | $W_{Out}$ (mm) | Particle amount at breakage (g/L) | Pressure loss (kPa) |
|---|---|---|---|---|---|---|---|---|
| Example 1-1 | 10 | 300 | 0.59 | 0.1 | 1.00 | 1.06 | 7.3 | 4.0 |
| Example 1-2 | 10 | 300 | 0.59 | 0.2 | 1.00 | 1.12 | 7.7 | 4.1 |
| Example 1-3 | 10 | 300 | 0.59 | 0.5 | 1.00 | 1.30 | 8.5 | 4.1 |
| Example 1-4 | 10 | 300 | 0.59 | 0.9 | 1.00 | 1.53 | 9.8 | 4.2 |
| Comparative Example 1 | 10 | 300 | 0.59 | 0.0 | 1.00 | 1.00 | 6.9 | 3.9 |
| Reference Example 1 | 10 | 300 | 1.00 | — | 1.00 | 1.00 | 10.2 | 3.7 |
| Example 2-1 | 15 | 300 | 0.31 | 0.5 | 1.00 | 1.15 | 10.3 | 5.5 |
| Example 2-2 | 15 | 300 | 0.31 | 1.0 | 1.00 | 1.31 | 11.4 | 5.7 |
| Comparative Example 2-1 | 15 | 300 | 0.31 | 1.7 | 1.00 | 1.53 | 13.8 | 6.0 |
| Comparative Example 2 | 15 | 300 | 0.31 | 0.0 | 1.00 | 1.00 | 9.7 | 5.3 |
| Reference Example 2 | 15 | 300 | 0.31 | — | 1.00 | 1.00 | 14.5 | 4.9 |
| Example 3-1-1 (3-2-1) | 15 | 160 | 0.51 | 0.2 | 1.00 | 1.10 | 10.2 | 4.1 |
| Example 3-1-2 | 15 | 160 | 0.51 | 0.6 | 1.00 | 1.30 | 11.8 | 4.8 |
| Example 3-1-3 | 15 | 160 | 0.51 | 1.0 | 1.00 | 1.51 | 13.2 | 5.0 |
| Example 3-1-4 | 15 | 160 | 0.51 | 1.7 | 1.00 | 1.51 | 13.8 | 5.8 |

TABLE 1-continued

| Examples | Partition wall thickness (mil) | Cell density (cpsi) | $OFA_{Out}/OFA_{In}$ | $\alpha$ | $W_{In}$ (mm) | $W_{Out}$ (mm) | Particle amount at breakage (g/L) | Pressure loss (kPa) |
|---|---|---|---|---|---|---|---|---|
| Example 3-2-2 | 15 | 160 | 0.46 | 0.2 | 1.00 | 1.09 | 8.4 | 5.3 |
| Example 3-2-3 | 15 | 160 | 0.42 | 0.2 | 1.00 | 1.08 | 7.8 | 4.5 |
| Reference Example 3 | 15 | 160 | 1.00 | — | 1.00 | 1.00 | 13.5 | 4.3 |

As is clear from Table 1, as the $OFA_{Out}/OFA_{In}$ ratio becomes smaller, the soot amount of crack generation in regeneration becomes smaller (see Reference Example 1 and Comparative Example 1). Also, as the α becomes larger, the soot amount of crack generation becomes larger (see Comparative Example 1 and Examples 1-1 to 1-4, and also see Comparative Example 2, Example 2-1, Example 2-2 and Comparative Example 2-1); however, when the α is 1.7 or larger, the soot amount at breakage increases but the pressure loss increases by 30% or more, which is not acceptable (Comparative Example 2-1).

In the regeneration control in actual engine, the fluctuation of the measurement accuracy of the soot amount which becomes a yardstick for regeneration start, is set generally at ±30%; therefore, when the particle amount at breakage is −30% or less from the value of Reference Example, a risk of crack formation in regeneration in actual use is extremely high. With respect to the pressure loss, the measurement accuracy of the pressure loss of the DPF installed in engine is generally ±30% as in the case of the soot amount; therefore, when the pressure loss is more or less than that, the detection of deposited soot amount by pressure loss is very difficult.

Industrial Applicability

The present invention can be used in an exhaust gas purification device for heat engine (e.g. internal combustion engine) or burner (e.g. boiler).

The invention claimed is:

1. A honeycomb structure comprising a plurality of columnar honeycomb segments in which two kinds of plural through-holes different in end face area are formed side by side by being surrounded by partition walls, each honeycomb segment having, at one end face, an inlet side of high opening ratio wherein through-holes of smaller end face area are plugged and, at other end face, an outlet side of low opening ratio wherein through-holes of larger end face area are plugged, the plurality of honeycomb segments being bonded to each other via a bonding material in the longitudinal direction of each honeycomb segment, in which honeycomb structure the Young's modulus of the bonding material when sintered is smaller than the Young's modulus of each honeycomb segment when sintered, and the bonded width of the bonding material is larger at the outlet side of honeycomb structure than at the inlet side of honeycomb structure, wherein the difference between the bonded width of the bonding material at the outlet side of the honeycomb structure and the bonded width of the bonding material at the inlet side of the honeycomb structure ranges from 0.06 mm to 0.53 mm.

2. A honeycomb structure according to claim 1, wherein, in the following formula (1), 0<α<1.7 is satisfied $$W_{Out}=W_{In}+\alpha \cdot OFA_{Out}/OFA_{In} \quad (1)$$

[wherein $W_{In}$ is a bonded width at inlet side, $W_{Out}$ is a bonded width at outlet side, $OFA_{In}$ is an opening ratio at inlet side, and $OFA_{Out}$ is an opening ratio at outlet side].

* * * * *